United States Patent [19]

Sumner

[11] Patent Number: 5,694,278
[45] Date of Patent: Dec. 2, 1997

[54] KEYING SLOTS ON CARTRIDGE

[75] Inventor: Wayne A. Sumner, Ogden, Utah

[73] Assignee: Iomega Corporation, Roy, Utah

[21] Appl. No.: 752,823

[22] Filed: Nov. 20, 1996

Related U.S. Application Data

[63] Continuation of Ser. No. 424,713, Apr. 18, 1995, abandoned.

[51] Int. Cl.[6] .................................................. G11B 23/03
[52] U.S. Cl. ........................ 360/133; 369/77.2; 369/291
[58] Field of Search ........................ 360/133, 99.02, 360/99.03, 99.06, 99.07; 369/77.2, 291; 235/487, 492, 495; 384/42; 312/9.21, 223.2

[56] References Cited

U.S. PATENT DOCUMENTS

| | | | |
|---|---|---|---|
| 3,650,378 | 3/1972 | Kakiuchi et al. | 360/132 |
| 4,320,430 | 3/1982 | Vogt | 360/133 |
| 4,400,748 | 8/1983 | Bauck et al. | 360/99 |
| 4,901,173 | 2/1990 | Jones et al. | 360/99.04 |
| 5,218,503 | 6/1993 | Martin | 360/133 |
| 5,262,918 | 11/1993 | Tannert | 360/133 |
| 5,280,403 | 1/1994 | Martin | 360/133 |
| 5,392,192 | 2/1995 | Dunn et al. | 361/683 |

*Primary Examiner*—Stuart S. Levy
*Assistant Examiner*—William R. Korzuch
*Attorney, Agent, or Firm*—Woodcock Washburn Kurtz Mackiewicz & Norris LLP

[57] ABSTRACT

A cartridge for a disk drive has a rigid shell with two keying grooves along the top and bottom edges of one side of the cartridge. These mate with projections on the cartridge receiving slot in the drive. One of the grooves extends deeper into one planar surface of the cartridge than the other groove. This prevents insertion of the cartridge with any other orientation of the cartridge than the correct orientation.

5 Claims, 5 Drawing Sheets

KEYING SLOTS ON CARTRIDGE

This is a continuation, of application Ser. No. 08/424,713, filed Apr. 18, 1995, now abandoned.

BACKGROUND OF THE INVENTION

This invention relates to data storage drives and, more particularly, to a removable cartridge for magnetic disk drives.

Magnetic disk drives which write and read digital data from flexible magnetic disks have been extensively used. "Floppy disk drives" have been extensively used for small, so-called microcomputer systems, for word-processing applications and the like. The flexible disk cartridge includes a relatively thin, flexible jacket which is inserted into the floppy disk drive.

Rigid disk drives, such as the IBM 3350, usually have a fixed rigid magnetic media. The magnetic heads do not contact the magnetic surface, but ride on a thin film of air. Because of this, and other features, these disk drives are capable of extremely precise and high speed operation. This type of disk drive is commonly referred to as a "Winchester" drive. Rigid disks enclosed in a rigid, removable cartridge, or shell have also been used. U.S. Pat. No. 4,864,452-Thompson, et al is an example of such a drive.

"Bernoulli" disk drives having performance characteristics similar to that of Winchester drives, but with removable cartridges, have been developed. A flexible magnetic disk is enclosed in a rigid box which is normally completely closed. U.S. Pat. No. 4,400,748-Bauck, et al and related patents to the common assignee show such drives using Bernoulli stabilized flexible disks. U.S. Pat. No. 4,901,173-Jones et al and related patents to a common assignee, show improvements which relate to so-called "half height" drives.

The particular shape of the cartridge visually identifies to the user that it can be inserted into the intended drive. However, this shape allows other similar sized cartridges to be inserted.

Most removable cartridge drives (magnetic and optical) typically use approximately the same form factor cartridges, i.e., 3.5", 5.25", etc. Hence if one of these cartridges is inserted into the cartridge slot of a non-mating drive there is a high probability that either the drive (heads, load mechanism, electronics, etc.) or the data on the disk could be damaged.

U.S. Pat. Nos. 5,218,513 - Martin and 5,280,403-Martin describe a disk drive with a cartridge which has a beveled edge. The beveled edge is compatible with a slanted portion of the disk drive in order to ensure that the cartridge is inserted into the drive in the proper orientation and that the cartridge is properly registered in the drive, so that the heads can be unloaded onto the disk. U.S. Pat. No. 5,262,918 Tannert shows a cartridge having a door opening groove and a guide groove. The guide groove cooperates with an interlocking recess in the drive to center the position and hold the cartridge in the drive.

The cartridges which have two slots on one side can be inserted with an improper orientation if they are inserted upside down and turned 180°. It is an object of the present invention to provide a cartridge having a unique shape and keying arrangement which allows insertion of a cartridge with only one orientation. The particular shape of the cartridge prevents damage to the drive and it prevents other cartridges from functioning in the drive.

SUMMARY OF THE INVENTION

In accordance with the invention, two keying grooves extend along the top and bottom edges of one side of the cartridge shell. This prevents possible damage caused by the insertion of similar sized cartridges, but with the wrong orientation. These grooves cooperate with projections on the front panel of the drive at the opening of the slot into which the cartridge is inserted. Because of these keying features, the cartridge must be inserted with a particular orientation.

The foregoing, and other features, advantages and objects of the invention will be better understood from the following more detailed description and appended claims.

SHORT DESCRIPTION OF THE DRAWINGS

DESCRIPTION OF THE PREFERRED EMBODIMENT

Figure 2:
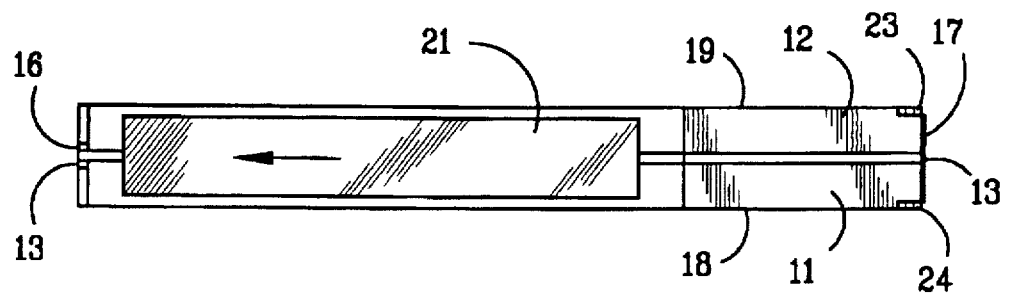
FIG. 2 is a front view of the cartridge.
Figure 1:
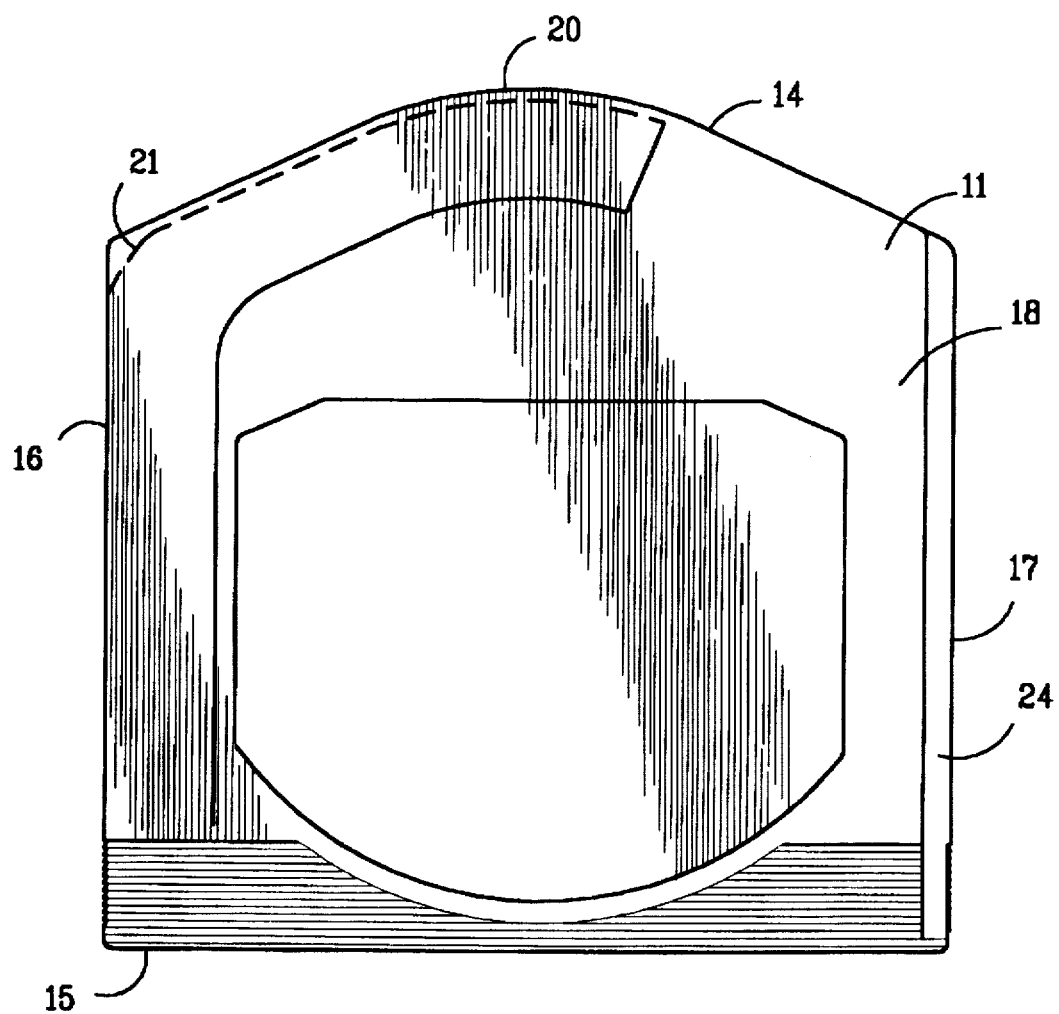
FIG. 1 shows a top view of the cartridge of the present invention.
Figure 3:
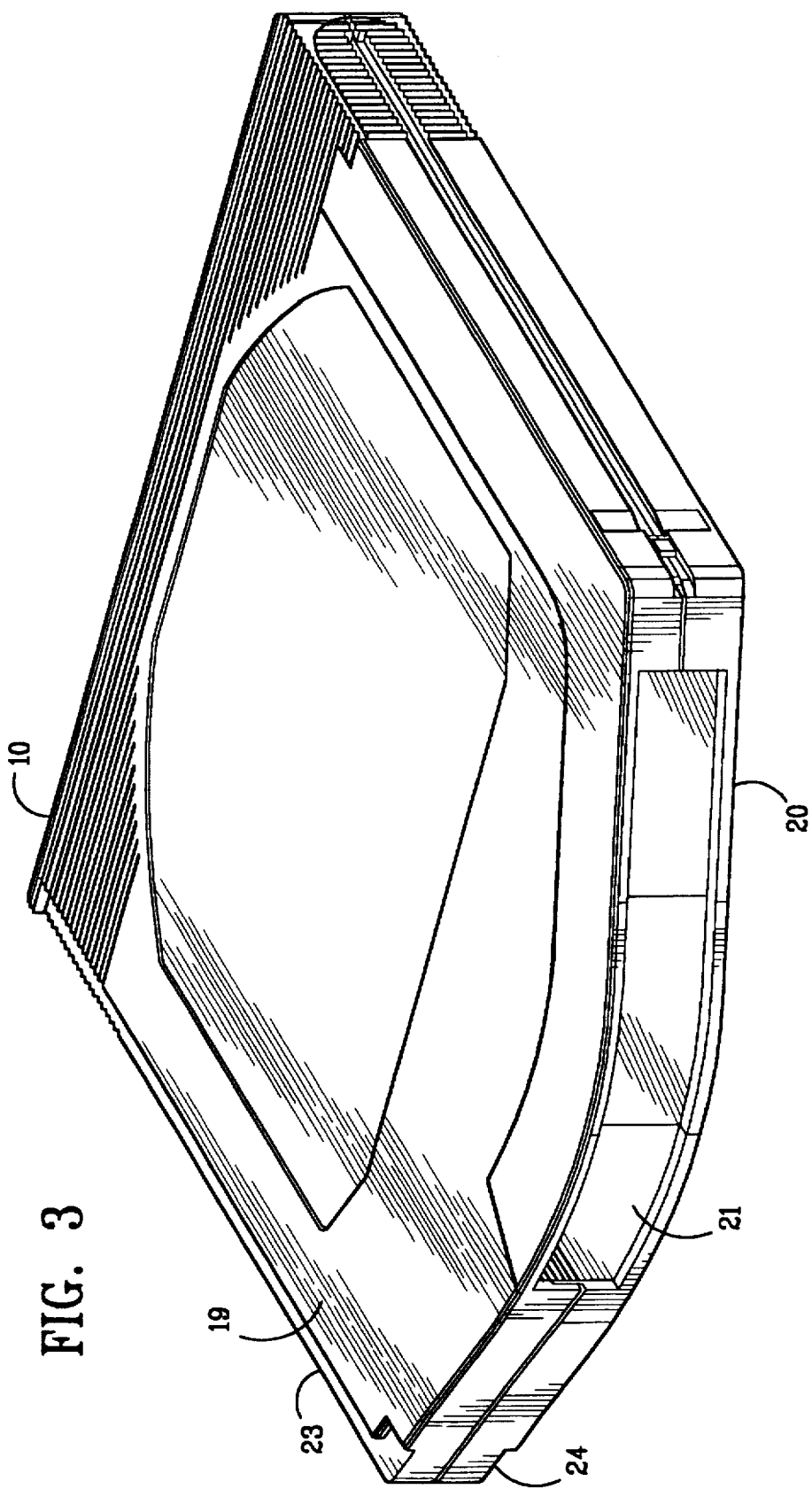
FIG. 3 is an isometric view of the cartridge with the door closed.
Figure 4:
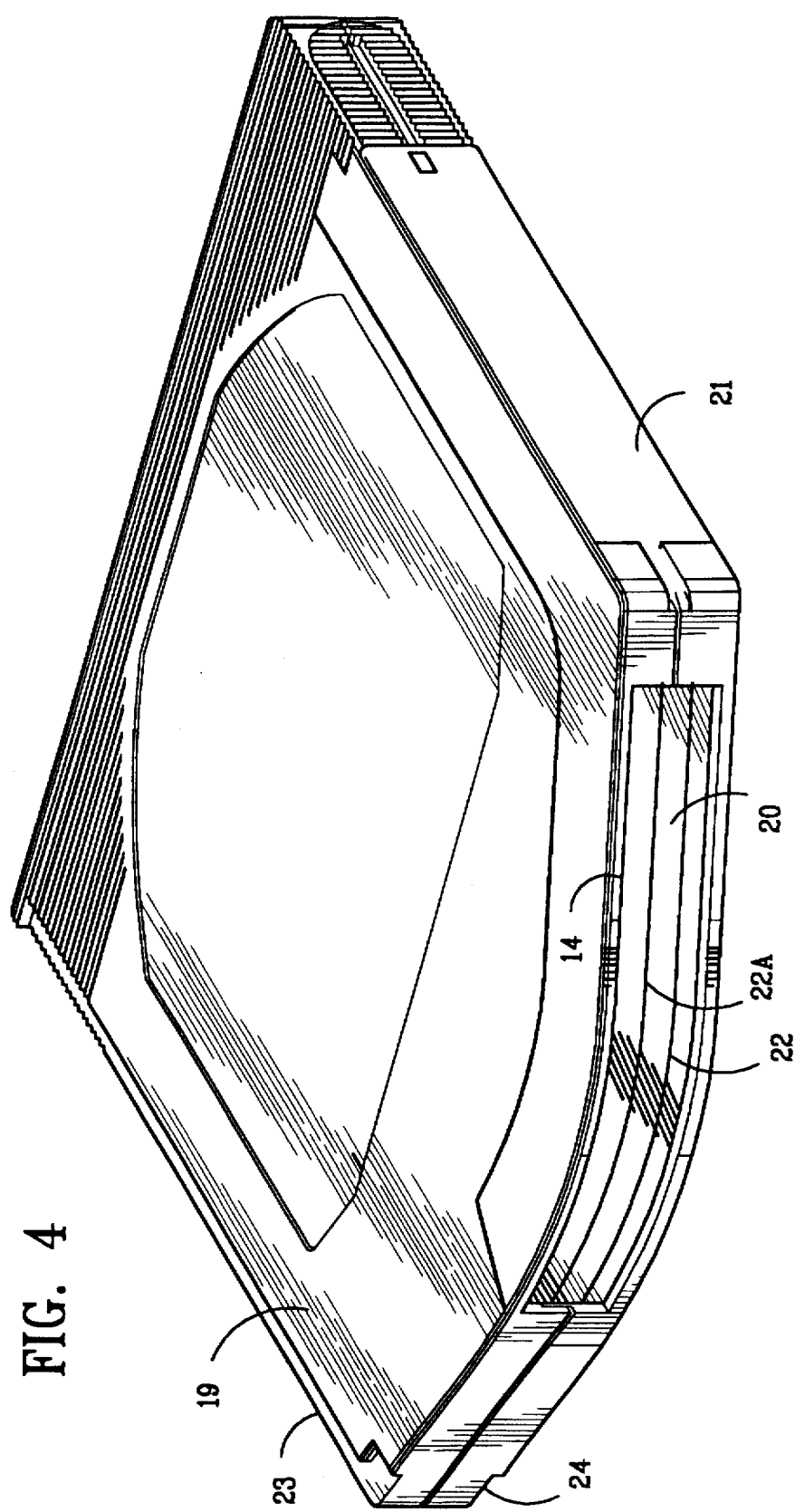
FIG. 4 is an isometric view of the cartridge with the door open.

FIGS. 1–4 show a cartridge having two halves 11 and 12 joined together at 13. The cartridge has a front 14, a back 15 and two sides 16 and 17 between substantially flat, planar surfaces 18 and 19. An opening 20 in the front of the cartridge provides access for the read/write heads to the recording disks 22, 22A (FIG. 4). A flexible door 21 covers the opening when the cartridge is removed from the drive.

Keying grooves 23 and 24 extend along the bottom and top edges of the side 17 of the shell. These keying grooves prevent the cartridge from being inserted into the drive with the wrong orientation.

The groove 24 extends deeper into the planar surface 18 than the other groove 23 extends into the planar surface 19. The corresponding projections on the drive match these differently extending grooves so that the cartridge can be inserted only with the proper orientation.

Figure 5:
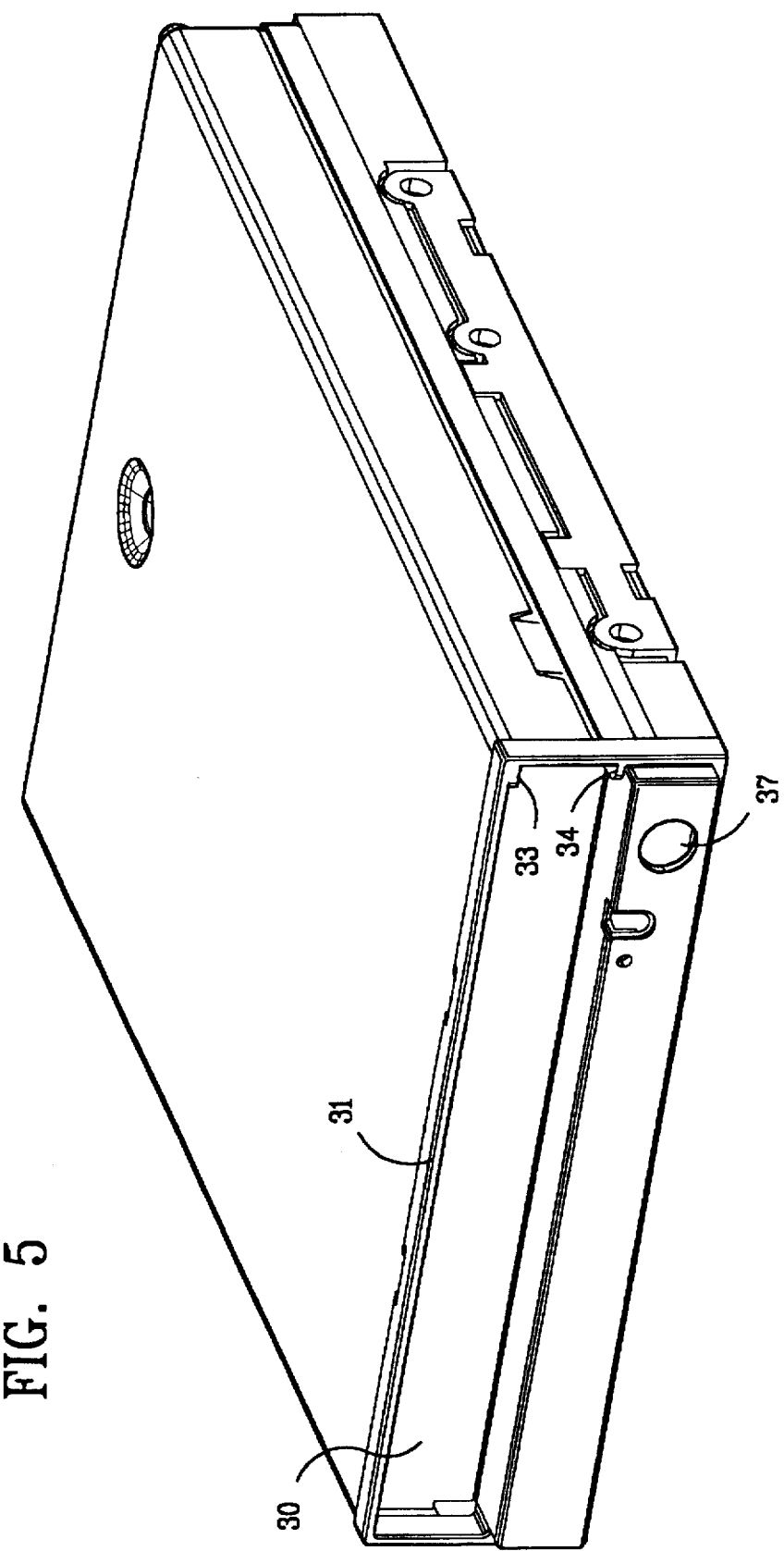
FIG. 5 shows the drive.
Figure 6:
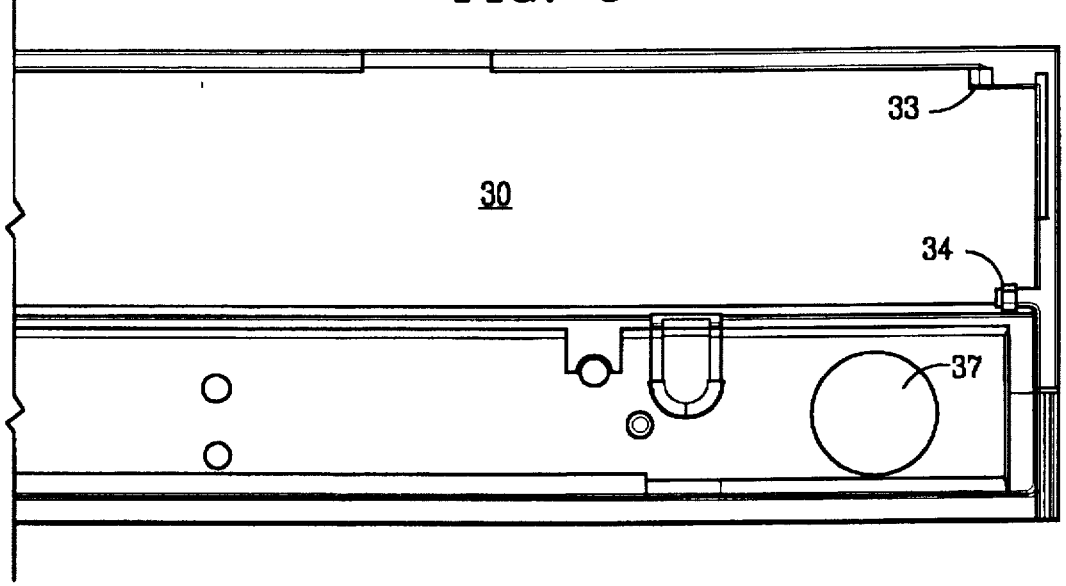
FIG. 6 is a view of the front panel.
Figure 7A:
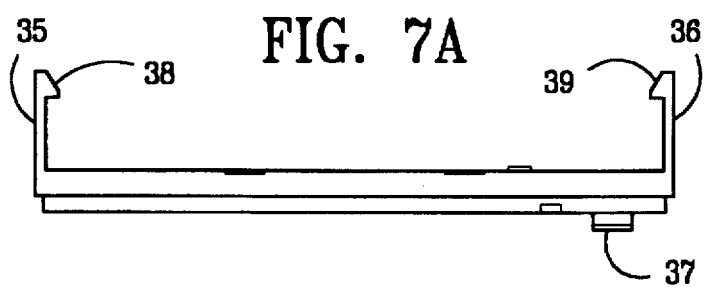
FIGS. 7A–7C are top, front and side views of the front panel.
Figure 7B:
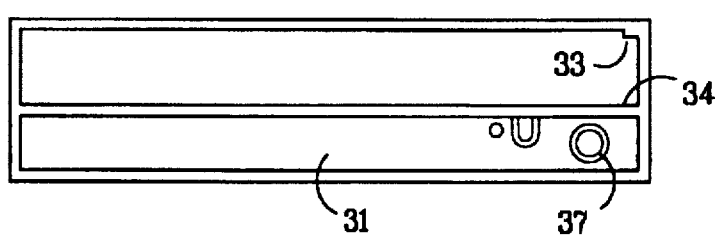
Figure 7C:
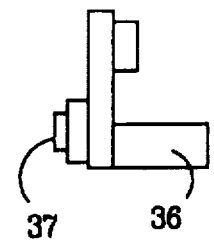

FIG. 5 shows the drive. A slot 30 in front of the drive receives the cartridge which is inserted into the drive for engagement of the read/write heads in the drive with the recording medium. The slot 30 is in a front panel 31 that snaps onto the chassis of the drive. Projections 33 and 34 on the front panel match the grooves 24 and 23 in the cartridge, respectively. These projections prevent the cartridge from being inserted unless it is properly oriented.

The front panel 31 is shown in FIGS. 6, 7A–7C. Legs 35, 36 have hooks 38, 39 which snap onto the chassis of the drive. Button 37 ejects the cartridge.

Other embodiments of the invention are possible. The appended claims are, therefore, intended to cover all embodiments within the true spirit and scope of the invention.

What is claimed is:

1. A cartridge for a drive having read/write heads which record data on a recording medium in said cartridge comprising:

a shell having a front, a back and two sides between substantially flat, planar surfaces;

the recording medium being in said shell;

an opening in the front of said shell for access by said read/write heads to said recording medium; and two keying grooves along top and bottom edges of one side of said shell, a first of said keying groves being along said top edge of one side of said shell, a second of said keying grooves being coextensive with said first groove along said bottom edge of one side of said shell, one of said keying grooves extending deeper into one of said planar surfaces than the other groove extends into the other planar surface, said keying grooves mating with corresponding structure in said drive to prevent said cartridge from being inserted into said drive with the wrong orientation.

2. The combination of a cartridge containing a recording medium and a drive having read/write heads which read/record data on said recording medium, said cartridge comprising:

a shell having a front, back, and two sides between top and bottom substantially flat planar surfaces;

the recording medium being in said shell;

an opening in the front of said shell for access by said read/write heads to said recording medium; and two keying grooves along top and bottom edges of one side of said shell, a first of said keying groves being along said top edge of one side of said shell, a second of said keying grooves being coextensive with said first groove along said bottom edge of one side of said shell, one of said keying grooves extending deeper into one of said planar surfaces than the other groove extends into the other planar surface, to prevent said cartridge from being inserted into said drive with the wrong orientation;

a drive having a slot into which said cartridge is inserted for engagement of said read/write heads with said recording medium; and two projections at one side of said slot, said projections mating with said keying grooves to ensure proper insertion of said cartridge into said drive.

3. The combination recited in claim 2 wherein said drive includes a front panel having said slot therein, said projections being on said front panel.

4. The combination recited in claim 3 wherein said front panel has a leg on each side thereof which snap onto said drive.

5. The combination recited in claim 4 wherein each leg has a hook at the end thereof, each hook snapping onto said drive.

* * * * *

UNITED STATES PATENT AND TRADEMARK OFFICE
CERTIFICATE OF CORRECTION

PATENT NO. : 5,694,278
DATED : December 2, 1997
INVENTOR(S) : Wayne A. Sumner

It is certified that error appears in the above-identified patent and that said Letters Patent is hereby corrected as shown below:

Col. 1, line 45, "5,218,513" should be --5,218,503--

Signed and Sealed this

Tenth Day of February, 1998

Attest:

BRUCE LEHMAN

*Attesting Officer*  *Commissioner of Patents and Trademarks*